United States Patent
Humfeld (10) Patent No.: US 9,430,814 B2
(45) Date of Patent: Aug. 30, 2016

(54) MOVE BASED AND SONIC BASED SUPER RESOLUTION

(71) Applicant: The Boeing Company, Chicago, IL (US)

(72) Inventor: Keith D. Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/499,399

(22) Filed: Sep. 29, 2014

(65) Prior Publication Data

US 2016/0093021 A1   Mar. 31, 2016

(51) Int. Cl.
*H04N 5/232*  (2006.01)
*G06T 3/40*   (2006.01)
*H04N 5/225*  (2006.01)

(52) U.S. Cl.
CPC ........... *G06T 3/4053* (2013.01); *H04N 5/2254* (2013.01); *H04N 5/23212* (2013.01)

(58) Field of Classification Search
CPC .................................................... H04N 5/349
USPC .............................. 348/208.11, 218.1, 219.1
See application file for complete search history.

(56) References Cited

U.S. PATENT DOCUMENTS

| | | | |
|---|---|---|---|
| 5,400,070 A * | 3/1995 | Johnson ................. | H04N 1/482 348/219.1 |
| 6,208,765 B1 | 3/2001 | Bergen | |
| 6,734,903 B1 * | 5/2004 | Takeda .................... | G03B 5/00 348/219.1 |
| 7,218,751 B2 | 5/2007 | Reed et al. | |
| 2002/0126209 A1 * | 9/2002 | Yamada ............... | H04N 3/1587 348/219.1 |
| 2006/0209201 A1 | 9/2006 | Spears et al. | |
| 2006/0215234 A1 * | 9/2006 | Vertoprakhov ........ | H04N 1/195 358/474 |
| 2008/0123802 A1 * | 5/2008 | Hirshenbein .......... | G01N 23/04 378/5 |

* cited by examiner

*Primary Examiner* — Joel Fosselman
(74) *Attorney, Agent, or Firm* — Miller, Matthias & Hull LLP (57) ABSTRACT

A camera system for producing super resolution images is disclosed. The camera system may include a lens, a detector array configured to capture an image focused through the lens onto a focal plane, and a transducer coupled to one of the lens and the detector array. The transducer may be configured to impart motion to the one of the lens and the detector array over a predetermined time period, and the detector array may capture a plurality of images over the predetermined time period.

20 Claims, 11 Drawing Sheets

|0|0|0|0|0|0|0|0|
|0|0|0|0|0|0|0|0|
|0|0|9|9|9|5|0|0|
|0|0|9|0|0|0|0|0|
|0|0|9|9|5|0|0|0|
|0|0|9|0|0|0|0|0|
|0|0|9|9|9|5|0|0|
|0|0|0|0|0|0|0|0|

MOVE BASED AND SONIC BASED SUPER RESOLUTION

FIELD OF THE DISCLOSURE

The present disclosure relates generally to camera systems and, more particularly, to super resolution in camera systems and methods.

BACKGROUND OF THE DISCLOSURE

Camera systems are an important component of satellites, unmanned aerial vehicles (UAVs), and other surveillance platforms used for the purpose of intelligence, surveillance, and reconnaissance (ISR). Recently, technology to enhance resolution in camera systems has been integrated into an increasing number of applications for use in both military and civilian environments. The resolution enhancement technology may take shape in a variety of forms across these applications. For example, some technology is implemented via computer software, while other resolution enhancements may result from the physical optics used.

However, resolution enhancement technology may be limited in digital camera systems. In particular, a digital camera may capture a digital image by detecting photons received by a charge coupled device (CCD) or other photodetector array over a period of time. The resolution of standard CCD camera data is sorely limited by a size and count of individual pixels in the CCD camera.

A computational technique called super resolution may be used to increase the resolution of the CCD camera beyond its physical limits. With super resolution techniques, images of a higher resolution than the resolution of the originally captured image may be produced. More specifically, super resolution techniques compare numerous lower resolution images to one another and then statistically develop a higher resolution image from these lower resolution images.

SUMMARY OF THE DISCLOSURE

In accordance with one embodiment, a camera system for producing super resolution images is disclosed. The camera system may include a lens, a detector array configured to capture an image focused through the lens onto a focal plane, and a transducer coupled to one of the lens and the detector array. The transducer may be configured to impart motion to the one of the lens and the detector array over a predetermined time period, and the detector array may capture a plurality of images over the predetermined time period.

In a refinement, the camera system may further include a processing unit configured to combine the plurality of images into a single image.

In another refinement, the processing unit may be further configured to produce the single image by interleaving the plurality of images.

In another refinement, the processing unit may be further configured to produce the single image using linear algebra.

In another refinement, at least part of the detector array may extend outside a boundary of the focal plane.

In another refinement, the transducer may be a piezoelectric transducer.

In another refinement, the transducer may be further configured to move the one of the lens and the detector array in increments along a horizontal direction and a vertical direction.

In another refinement, the transducer may be coupled to the detector array, and each increment may be a fraction of a length of an individual detector in the detector array.

In another refinement, the transducer may be further configured to incrementally move the detector array relative to the focal plane according to predetermined resolution enhancement dimensions.

In another refinement, a target image and the lens may remain stationary over the predetermined time period.

In another refinement, the transducer may be coupled to the lens, the transducer being configured to move the lens over the predetermined time period while the detector array remains stationary.

In another refinement, the transducer may be a speaker transducer configured to apply a sound wave across the one of the lens and the detector array.

In another refinement, the piezoelectric transducer be configured to stretch and compress the detector array to induce a pressure wave.

In accordance with another embodiment, a method for enhancing a resolution of a digital camera system having a lens and a detector array is disclosed. The method may include the detector array capturing an image, imparting motion to one of the lens and the detector array, the detector array capturing another image, and combining the images into a single image having enhanced resolution.

In a refinement, the step of imparting motion to one of the lens and the detector array may include shifting the detector array to a different position using a transducer coupled to the detector array.

In another refinement, the method may further include the transducer advancing the detector array in increments along horizontal and vertical directions, and the detector array capturing an image after each increment.

In another refinement, the step of imparting motion to one of the lens and the detector array may include the transducer inducing a pressure wave across the one of the lens and the detector array.

In accordance with yet another embodiment, a method for enhancing a resolution of a digital camera system having a lens and a detector array is disclosed. The method may include applying a sound wave across one of the lens and the detector array over a predetermined time period, and selectively capturing a plurality of images using the detector array during the predetermined time period.

In a refinement, the step of selectively capturing a plurality of images using the detector array over the predetermined time period may include capturing at least one image when the detector array is in an unstrained state, at least one image when the detector array is in a maximum compressed state, and at least one image when the detector array is in a maximum stretched state.

In another refinement, the method may further include comparing intensities from the plurality of images to determine photon counts on sub-pixels of a combined image.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
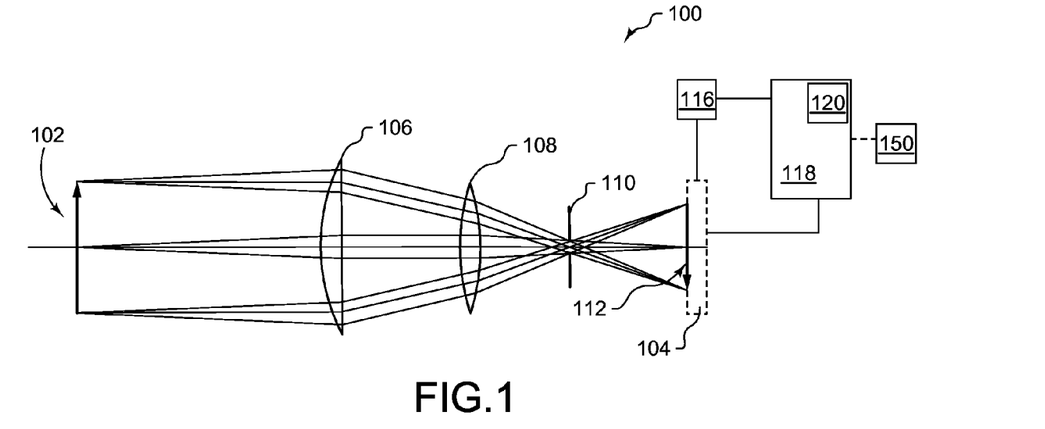
FIG. 1 is a schematic view of a camera system in accordance with one embodiment of the present disclosure.

FIG. 1 schematically illustrates a camera system 100 for producing super resolution digital images, in accordance with an embodiment of the present disclosure. With the camera system 100, a target image 102 may be captured by a detector array 104. For example, one or more lenses 106, 108, an aperture 110, or other optical elements (not shown) may focus light from the image 102 onto a focal plane 112. Positioned at the focal plane 112, the detector array 104 may be configured to detect an intensity of the light from the target image 102.

Figure 2:
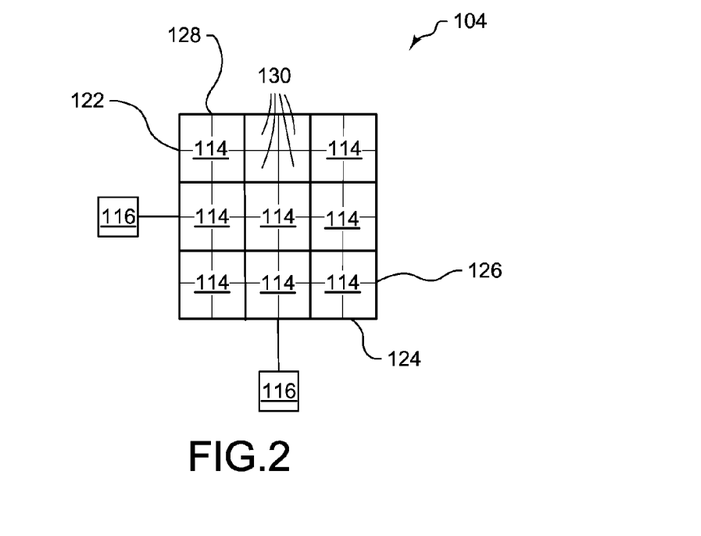
FIG. 2 is a diagrammatic view of a detector array of the camera system of FIG. 1.

Referring now to FIG. 2, with continued reference to FIG. 1, the detector array 104 may comprise an array of individual detectors 114 configured to record image data. For example, a detector 114 may comprise a charge coupled device (CCD), a CMOS sensor, or other image sensor. Each detector 114 may measure and store the light intensity, or photon count per unit time, at its location. The example detector array 104, in FIG. 2, illustrates a three-by-three (3×3) array of twenty micron (20μ) square detectors 114. However, the detector array 104 is not limited to nine square detectors 114. Other dimensions for the detector array 104 and detectors 114 may certainly be used.

In order to produce super resolution images, the camera system 100 may include one or more transducers 116. The transducers 116 may be configured to convert electrical signals into mechanical energy. For example, the transducers 116 may be coupled to the detector array 104, and may be configured to impart motion to the detector array 104. It is to be understood that although camera system 100 is shown and described as including a transducer, other means for imparting motion may also be used. By imparting motion to the detector array 104, while the target image 102, and the lenses 106, 108 remain stationary, the camera system 100 may capture a plurality of images over a predetermined time period. The plurality of images captured by the detector array 104 may then be combined into a single super resolution image.

The camera system 100 may also include a control unit 118 (FIG. 1) configured to control the detector array 104 and transducer 116. The control unit 118 may comprise a processor, such as a "computer processor," or processor-based device that may include or be associated with a non-transitory computer readable storage medium having stored thereon computer-executable instructions. One or more algorithms may be programmed into a memory 120 (FIG. 1) associated with the control unit 118. The memory 120 may comprise a non-volatile memory. It is to be understood that the control unit 118 may include other hardware, software, firmware, and combinations thereof.

According to one embodiment, the camera system 100 may include a move-based super resolution mode, or "move mode", preprogrammed into the memory 120 of the control unit 118. The move mode may shift the detector array 104 via transducers 116 to different positions relative to the focal plane 112 over a predetermined time period. Each time the detector array 104 is in a different position, the detector array 104 may capture an image, thereby accumulating a plurality of images over the predetermined time period.

For example, the transducers 116 may be composed of piezoelectric material. When the camera system 100 is in move mode, the control unit 118 send signals to one (or more) of the transducers 116 in order to move the detector array 104. In response, the piezoelectric transducer 116 may convert the electrical energy from the signals into precise mechanical movement of the detector array 104. It is to be understood that other types of transducers than piezoelectric transducers may be used as well.

As shown in FIG. 2, one transducer 116 may be coupled to a first vertical edge 122 of the detector array 104 in order to move the detector array 104 in a horizontal direction (left and right). Another transducer 116 may be coupled to a first horizontal edge 124 of the detector array 104 in order to move the detector array 104 in a vertical direction (up and down). However, the transducers 116 may certainly be coupled to a second vertical edge 126, a second horizontal edge 128, and/or other locations on the detector array 104. In addition, more or less than two transducers may be used to move the detector array in various directions.

Moreover, each transducer 116 may be further configured to move the detector array 104 in increments along the horizontal and vertical directions. Each increment may comprise a fraction of a length of an individual detector 114 in the detector array 104. To determine the fractional length of the increments, each detector 114 in the detector array 104 may be theoretically divided into smaller sub-pixels 130. In the example of FIG. 2, each twenty micron (20µ) square detector 114 is divided into four sub-pixels 130. More specifically, each detector 114 is segmented into a two-by-two array of ten micron (10µ) square sub-pixels 130.

In move mode, the detector array 104 may be shifted a length of a sub-pixel 130 in the horizontal direction and may be shifted a height of a sub-pixel 130 in the vertical direction. The length and height of the example sub-pixel 130, in FIG. 2, is ten microns (10µ). Thus, using the transducer 116, the detector array 104 may be moved half of a length of an individual detector 114 in the horizontal direction and may be moved half of a height of an individual detector 114. However, other arrangements of sub-pixels are certainly possible, and therefore, other fractional lengths and increments may be used.

Figure 3:
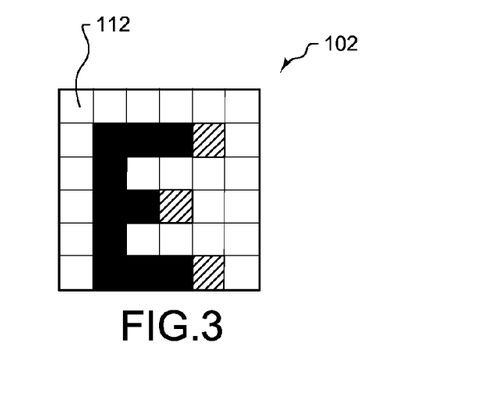
FIG. 3 is a diagrammatic view of a target image for the camera system of FIG. 1.
Figure 4:
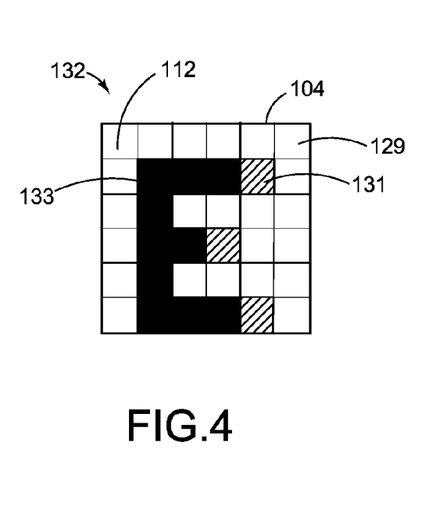
FIG. 4 is a diagrammatic view of the detector array of FIG. 2 centrally aligned with a focus of a projected target image on a focal plane in a first position.

Referring now to FIGS. 3-15, with continued reference to FIGS. 1 and 2, an example of the move mode in camera system 100 is illustrated. More specifically, as shown in FIG. 3, an example target image 102 may be focused onto focal plane 112. As shown in FIG. 4, the detector array 104 may be centrally aligned with a focus of the focal plane 112 when the detector array 104 is in a first position 132.

Figure 5:
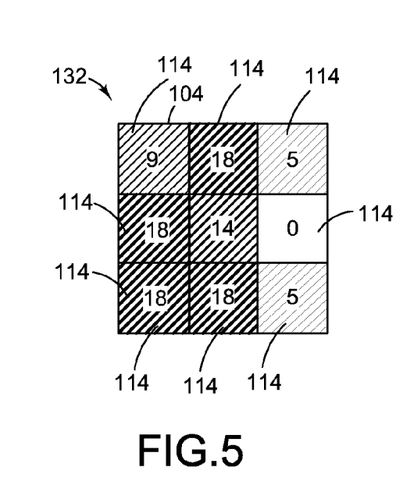
FIG. 5 is a diagrammatic view of light intensities detected by individual detectors of the detector array in the first position of FIG. 4.

To capture an image in the first position 132, each individual detector 114 in the detector array 104 may detect a light intensity per unit time in a location of the detector 114. In this example, a white sub-pixel 129 may have a photon count of zero (0), a black sub-pixel 131 may have a photon count of nine (9), and a gray sub-pixel 133 may have a photon count of five (5). With this representative scale, the light intensities detected by each individual detector 114 in the detector array 104 are shown in FIG. 5.

Figure 6:
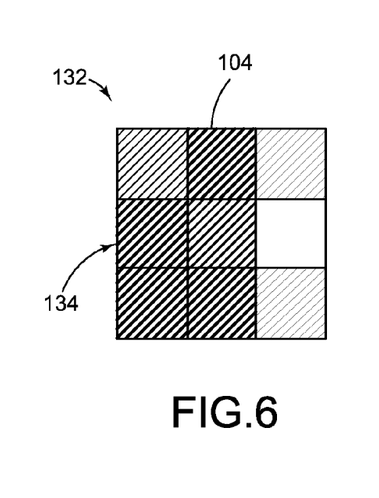
FIG. 6 is a diagrammatic view of a first image captured by the detector array in the first position of FIG. 4.

Using the measured and stored photon counts, a first image 134 captured by the detector array 104 in the first position 132 is shown in FIG. 6. Comparing the first image 134, in FIG. 6, to the target image 102, in FIG. 3, demonstrates an inherent low resolution of the detector array 104. By itself, the detector array 104 is not sufficient to capture fine details of the target image 102.

Figure 7:
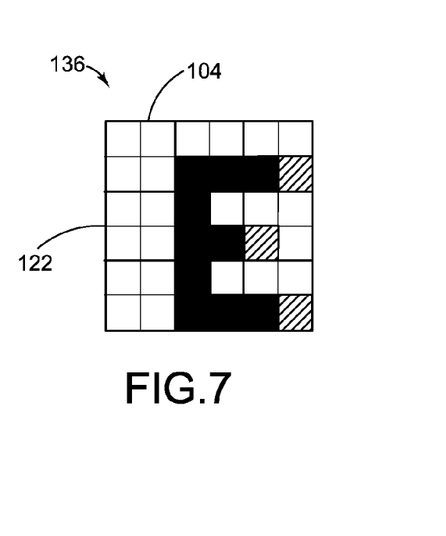
FIG. 7 is a diagrammatic view of the detector array shifted to a second position from the first position of FIG. 4.
Figure 8:
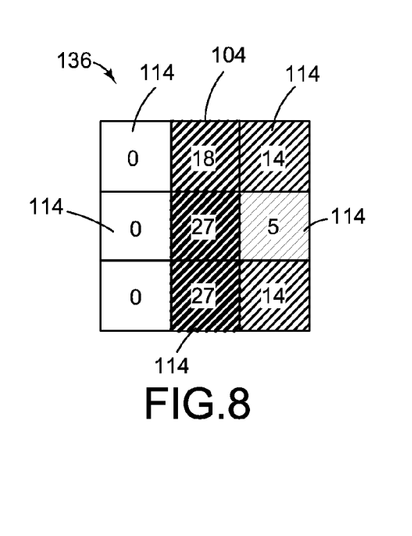
FIG. 8 is a diagrammatic view of light intensities detected by individual detectors of the detector array in the second position of FIG. 7.
Figure 9:
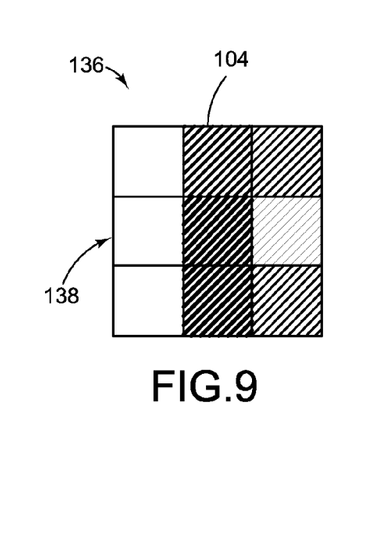
FIG. 9 is a diagrammatic view of a second image captured by the detector array in the second position of FIG. 7.

However, using the move mode in the camera system 100 enables the detector array 104 to capture a plurality of images for super resolution enhancement. As shown in FIG. 7, the detector array 104 may be shifted to a second position 136. More specifically, the detector array 104 may be moved one increment in the horizontal direction towards the first vertical edge 122 (or to the left of the focal plane 112.) Light intensities detected by each individual detector 114 of the detector array 104 in the second position 136 are shown in FIG. 8. A second image 138 captured by the detector array 104 in the second position 136 is shown in FIG. 9.

Figure 10:
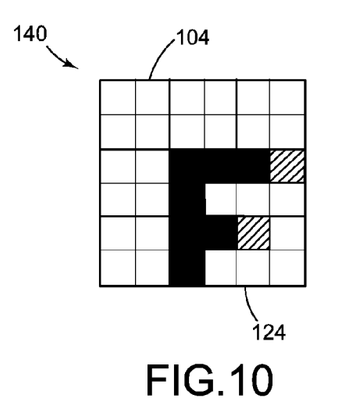
FIG. 10 is a diagrammatic view of the detector array shifted to a third position from the second position of FIG. 7.
Figure 11:
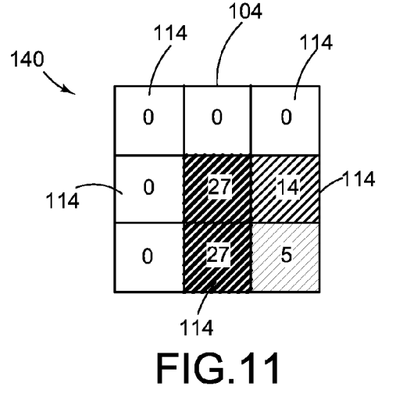
FIG. 11 is a diagrammatic view of light intensities detected by individual detectors of the detector array in the third position of FIG. 10.
Figure 12:
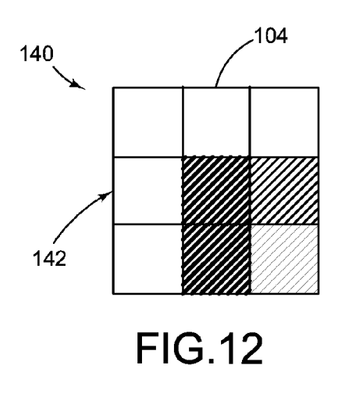
FIG. 12 is a diagrammatic view of a third image captured by the detector array in the third position of FIG. 10.

In an iteration shown in FIG. 10, the detector array 104 may be shifted to a third position 140 where the detector array 104 is moved one increment in the vertical direction away from the first horizontal edge 124 (or in an upward direction of the focal plane 112.) Light intensities detected by each individual detector 114 of the detector array 104 in the third position 140 are shown in FIG. 11. A third image 142 captured by the detector array 104 in the third position 140 is shown in FIG. 12.

Figure 13:
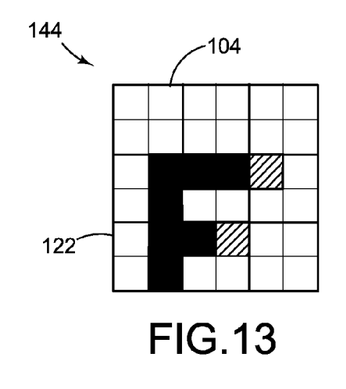
FIG. 13 is a diagrammatic view of the detector array shifted to a fourth position from the third position of FIG. 10.
Figure 14:
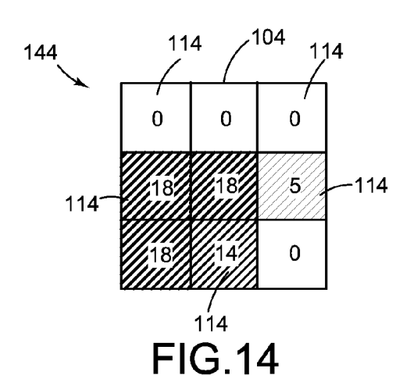
FIG. 14 is a diagrammatic view of light intensities detected by individual detectors of the detector array in the fourth position of FIG. 13.
Figure 15:
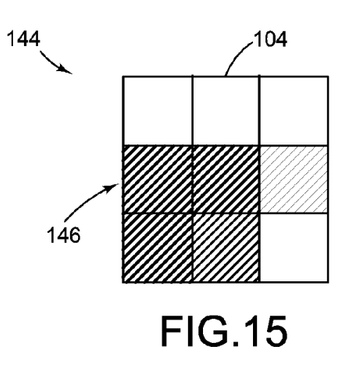
FIG. 15 is a diagrammatic view of a fourth image captured by the detector array in the fourth position of FIG. 13.

In a subsequent iteration, the detector array 104 may be shifted to a fourth position 144, shown in FIG. 13. The detector array 104 is moved one increment in the horizontal direction away from the first vertical edge 122 (or to the right of the focal plane 112.) Light intensities detected by each individual detector 114 of the detector array 104 in the fourth position 144 are shown in FIG. 14. A fourth image 146 captured by the detector array 104 in the fourth position 144 is shown in FIG. 15. To return to the first position 132, the detector array 104 may be moved one increment in the vertical direction toward the first horizontal edge 124 (or in a downward direction of the focal plane 112.)

The camera system 100 may further include a processing unit 150 (FIG. 1) configured to combine the plurality of images into a single super resolution image. The processing unit 150 may be integral to or separate from the control unit 118 of the camera system 100. In one example, the processing unit 150 may comprise a second processor associated with a second memory that is in communication with the control unit 118 and memory 120. For instance, the processing unit 150 may be included with the optics and control unit 118. Alternatively, the processing unit 150 may be included on a separate component, such as, a personal computer (PC), used at a later time to process the plurality of images captured by the detector array.

Figure 16:
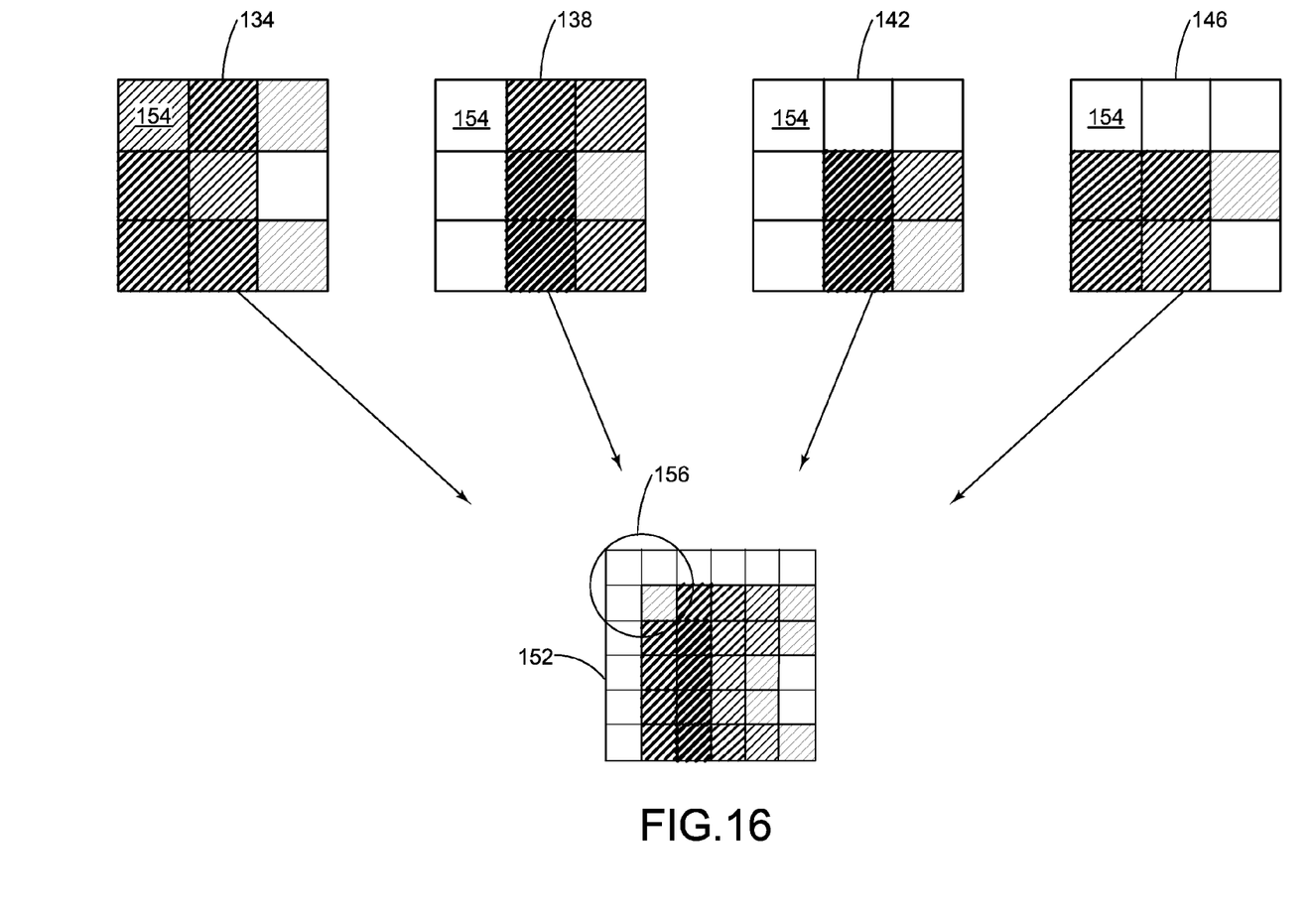
FIG. 16 is a diagrammatic view of an interleaving process performed on the first, second, third, and fourth images of FIGS. 6, 9, 12, and 15, in accordance with another embodiment.

The processing unit 150 may combine the plurality of images into a single image 152 via an interleaving process. The processing unit 150 may interleave the first image 134, the second image 138, the third image 142, and the fourth image 146 into a single super resolution image 152, as shown in FIG. 16, by arranging each of the intensities from each of the four images next to each other. For example, the intensities from a top left detector 154 of each image 134, 138, 142, 144 may be placed next to each other according to the position each was taken and displayed in a smaller size in a top left corner 156 of the single image 152.

Repeating the interleaving process for the rest of the detectors 114 in the detector array 104 results in the single image 152 having an enhanced resolution image that shows more feature definition than the original images. Namely, interleaving the four three-by-three (3×3) pixel images 134, 138, 142, 144 results in the single six-by-six (6×6) pixel image 152 and a two-by-two (2×2) resolution enhancement. It is to be understood that more than four images may be captured during the predetermined time period, thereby resulting in a higher resolution single image. The process illustrated and described above, in connection with FIGS. 3-16, may be repeated according to various predetermined resolution enhancement dimensions for any size (m×n) of sub-pixel arrays.

Referring now to FIGS. 17-20, with continued reference to FIGS. 1-16, the processing unit 150 may also combine the plurality of images using linear algebra. In order to form linear algebraic equations, each sub-pixel of a reference array 158 may be labelled with a variable index, such as that shown in FIG. 17. For instance, each sub-pixel of a six-by-six (6×6) array 160 may be assigned a variable a through aj (a, b, c, d, . . . ad, af, ai, aj), indicating that an intensity of the sub-pixel is unknown. Other variable indices and reference arrays than that shown in FIG. 17 may certainly be used.

Furthermore, when capturing the plurality of images, at least part of the detector array 104 may extend outside a boundary 162 of the target image 102 projected onto the focal plane 112 during at least part of the predetermined time period in move mode. The boundary 162 may be determined by the aperture 110, since the target image 102 is projected through the aperture 110 onto the focal plane 112. For example, in move mode, the detector array 104 may be shifted to certain positions that capture some images with the detector array 104 outside the boundary 162, resulting in the reference array 158 having a border 164 with light intensities of zero (0). Each sub-pixel of the border 164 may be a same size as the sub-pixels in the array 160.

More specifically, from the first position 132 when the detector array 104 is centrally aligned with the focus of the focal plane 112, the camera system 100, in move mode, may aim to move the detector array 104 such that the border 164 having light intensities of zero (0) is captured. This is done by extending at least part of the detector array 104 beyond the boundary 162 where no light is incident. In so doing, each sub-pixel of the border 164 may be labelled with the known light intensity of zero (0).

Figure 17:
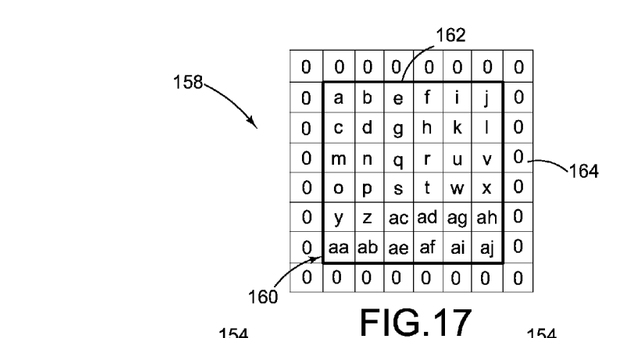
FIG. 17 is a diagrammatic view of a reference array for processing via linear algebra, in accordance with another embodiment.

It is to be understood that although the border 164 is illustrated, in FIG. 17, as having two rows and two columns of zero intensity sub-pixels, other configurations for the border 164 may be used. For example, the border 164 may comprise only one row and one column of zero intensity sub-pixels.

Figure 18:
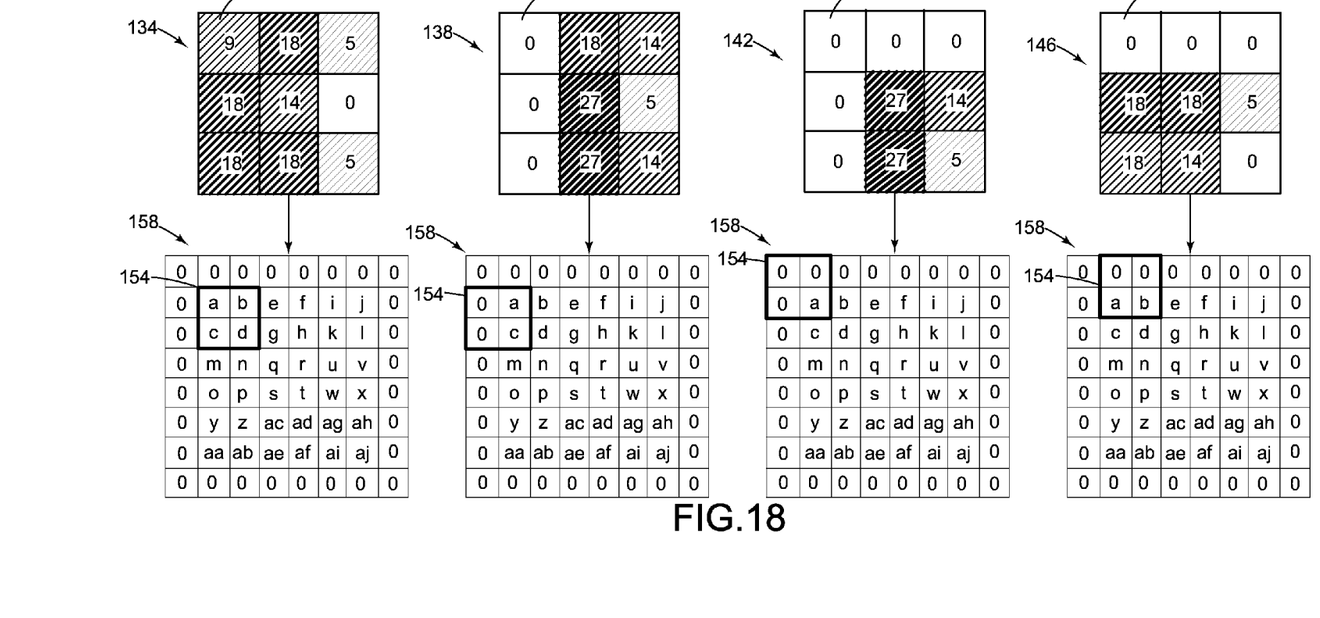
FIG. 18 is a diagrammatic view of applying the reference array of FIG. 17 to the images of FIGS. 6, 9, 12, and 15, in accordance with another embodiment.

By assigning a sub-pixel variable index and providing a border of zero light intensity, the processing unit 150 can set up equations for the reference array 158 that are efficiently solved by linear algebra. As shown in an example for the top left detector 154, in FIG. 18, when applying the reference array 158 to each of the first image 134, the second image 138, the third image 142, the fourth image 146, and their detected light intensities, the following equations may be established:

$a+b+c+d=9$ $a+0+c+0=0$ $a+0+0+0=0$ $a+b+0+0=0$

Using linear algebra to solve for variables a, b, c, and d, gives the following solution:

$a=b=c=0, d=9$

Figure 19:
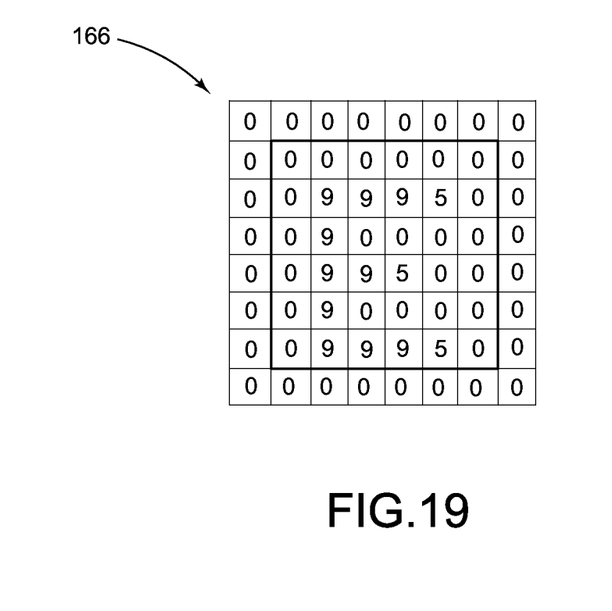
FIG. 19 is a diagrammatic view of a solution array from the linear algebra application in FIG. 18.
Figure 20:
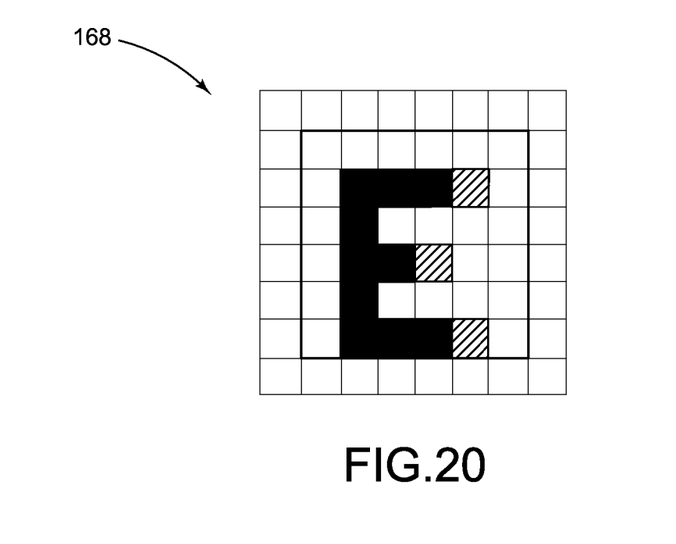
FIG. 20 is a diagrammatic view of a single super resolution image that resulted from the solution array of FIG. 19.

With variables a, b, c, and d solved, the processing unit 150 may iteratively solve for the other variables e through aj (e, f, g, . . . ai, aj). Determining the light intensities for each sub-pixel of the reference array 158 via linear algebra results in a solution array 166, shown in FIG. 19. Applying the representative scale for light intensity values (the white sub-pixel having a photon count of 0, the black sub-pixel having a photon count of 9, and the gray sub-pixel may having a photon count of 5) to the solution array 166 leads to a single super resolution image 168, in FIG. 20. As shown, using linear algebra to combine the four images 134, 138, 142, 144 produces the single image 168 having four times the resolution as a camera system without move mode.

It is to be understood that the examples shown and described above, in FIGS. 2-20, are for explanatory purposes, and that the disclosed system 100 and techniques may be used with more or less iterations in order to achieve super resolution. The disclosed system 100 and techniques may be used and modified according to various predetermined resolution enhancement dimensions for any size (m×n) of sub-pixel arrays.

In addition, the camera system 100 may impart motion to the detector array 104 in other ways. Although the motion imparted by the transducer 116 in the move mode physically shifts the entire detector array 104 to different positions, other types of motion may be imparted. For example, according to another embodiment, the camera system 100 may include a sonic-based super resolution mode, or "sonic mode", preprogrammed into the memory 120 of the control unit 118. The sonic mode may move the detector array 104 via sound, which is a vibration that propagates as a mechanical wave of pressure. Sound or pressure waves cause materials to strain. Therefore, when applied to the detector array 104, sound waves may change a size of the detector array 104.

In one example of the sonic mode, the transducer 116 may be a speaker transducer configured to induce sound waves across the detector array 104. In another example, similar to the move mode, the transducer 116 may be a piezoelectric transducer extending across the detector array 104. The piezoelectric transducer may be configured to stretch and compress the detector array 104, thereby inducing pressure waves across the detector array 104. By imparting motion to the detector array 104 through sound, a plurality of images may be captured at different sizes of the detector array 104 over a predetermined time period.

Figure 21:
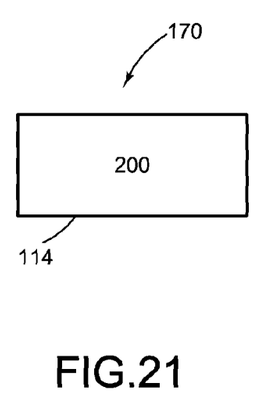
FIG. 21 is a diagrammatic view of a detector in an unstrained state, in accordance with another embodiment.

Referring now to FIGS. 21-24, with continued reference to FIGS. 1-20, an example of the sonic mode in camera system 100 is illustrated on one detector 114. As shown in FIG. 21, in an unstrained state, the detector 114 may be twenty microns (20μ) in length and may measure 200 photons per unit time in an image 170. With the target image 102 and the lenses 106, 108 remaining stationary, sound or pressure waves may be induced across the detector array 104 and each individual detector 114. If the transducer 116 is coupled to the first vertical edge 122 (FIG. 2) of the detector array 104, for example, the detector 114 will stretch and compress in the horizontal direction.

Figure 22:
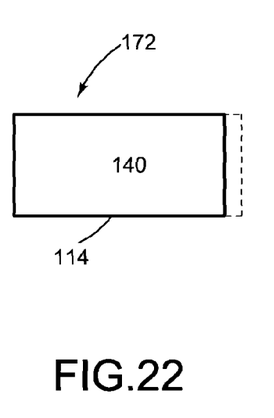
FIG. 22 is a diagrammatic view of a detector in maximum compressed state, in accordance with another embodiment.
Figure 23:
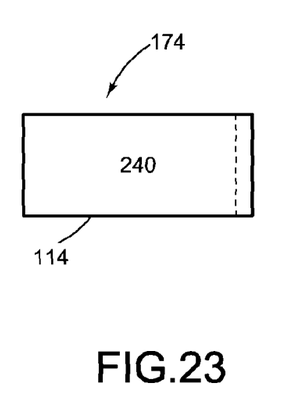
FIG. 23 is a diagrammatic view of a detector in a maximum stretched state, in accordance with another embodiment.
Figure 24:
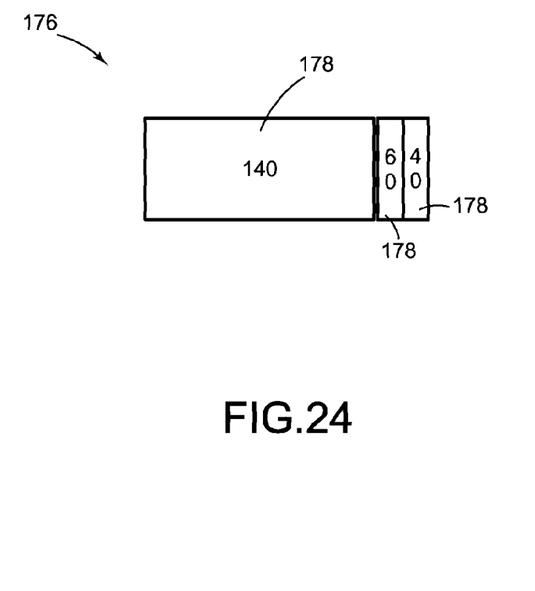
FIG. 24 is a diagrammatic view of a single image combined from the images of FIGS. 21-23, in accordance with another embodiment.

As shown in FIG. 22, in a maximum compressed state, the detector 114 may be compressed to eighteen microns (18μ) in length and may measure 140 photons per unit time in an image 172. In a maximum stretched state, shown in FIG. 23, the detector 114 may be twenty-two microns (22μ) in length and may measure 240 photons per unit time in an image 174. Combining the three images 170, 172, 174 together produces a single image 176 of variable intensity in the direction of sound wave propagation, as shown in FIG. 24.

More specifically, the photon counts captured in the unstrained state, the maximum compressed state, and the maximum stretched state from the three images 170, 172, 174 may be compared to each other in order to determine photon counts incident on sub-pixels 178 of the single image 176. The intensities from each of the sub-pixels 178 are then combined to produce the super resolution image 176. It is to be understood that a collection of photon counts in different states during sound wave propagation other than the unstrained state, the maximum compressed state, and the maximum stretched state may also be acquired.

Various frequencies for the sound or pressure waves may be used. Furthermore, during the predetermined time period that the camera system 100 is in sonic mode, the detector 114 may measure the light intensities within predetermined time intervals when the detector is unstrained, maximally compressed, and maximally stretched. Moreover, with the frequency of the sound wave being cyclical, a sampling of photon counts per unit time may be collected and averaged together.

In addition, using a different direction of sound wave propagation can enhance resolution in that direction. For example, with another transducer 116 coupled to the first horizontal edge 124 (FIG. 2) of the detector array 104, the detector 114 will stretch and compress in the vertical direction when sound is applied. Therefore, inducing sound waves in two perpendicular directions, e.g., horizontal and vertical, may result in a grid-type refinement. It is to be understood that sound wave propagation may be applied in directions other than horizontal and vertical. For example, a sound wave may be induced in a diagonal direction across the detector 114 and detector array 104. Furthermore, choosing various directions for sound wave propagation can allow for variable shapes, sizes, and intensity maps of the detector array 114, which may then be used to produce super resolution images.

Figure 25:
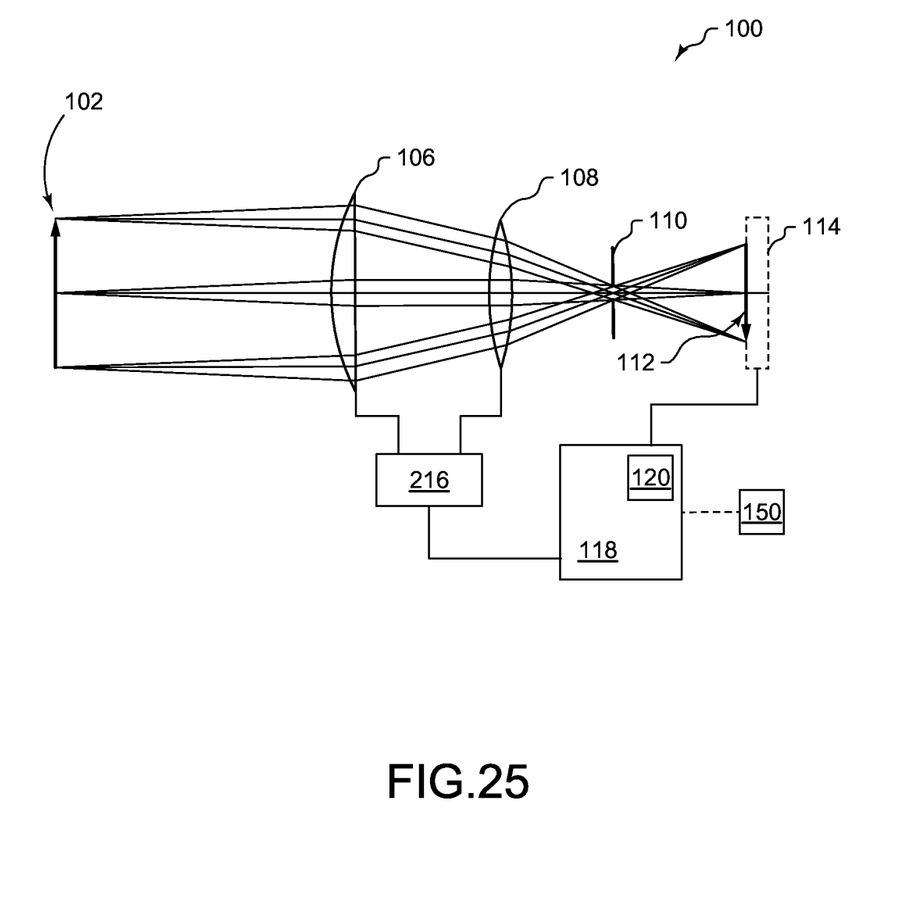
FIG. 25 is a schematic view of a camera system, in accordance with another embodiment.

In another embodiment, shown in FIG. 25, motion may be imparted to one or more of the lenses 106, 108 instead of the detector array 114 in order to achieve similar results as described above. For example, the lenses 106, 108 may move, while the target image 102 and the detector array 114 remain stationary. Imparting motion to the lenses 106, 108 moves the focus of the projected image on the focal plane 112 relative to the detector array 114. The detector array 114 may then capture a plurality of images during a predetermined time period in order to allow for super resolution enhancement.

For instance, one or more transducers 216 may be coupled to the lenses 106, 108. The transducers 216 may be speaker transducers or piezoelectric transducers. In the move and sonic modes, the lenses 106, 108 may shift positions and change sizes. Changing the lens strain will change the direction in which light is bent, thereby changing the location of the photon paths on the detector array 114 when the target image 102 is not moving. By strategic choice of the distance to the focal plane and the sound intensity, the camera system 100 may be designed to provide super resolution over the entire focal plane 112.

Furthermore, noise outside of the camera system 100 may affect the super resolution images. The noise, which is not intentionally induced by the camera system 100, may relate to a square root of the photon count. Therefore, accommodations to the camera system 100 to eliminate an impact of noise to super resolution images may be warranted.

INDUSTRIAL APPLICABILITY

In general, the foregoing disclosure finds utility in various applications relating to camera systems. In particular, the disclosed systems and techniques may be used to provide super resolution images. For example, the disclosed systems and techniques may be employed in, but not limited to, satellites, unmanned aerial vehicles (UAVs), and other surveillance platforms used for the purpose of intelligence, surveillance, and reconnaissance (ISR), and for other applications for use in both military and civilian environments.

By implementing the disclosed systems and techniques to digital camera systems, a cost-effective and efficient solution for improving resolution of an image is provided. The disclosed move-based super resolution mode and sonic-based super resolution mode may be easily implemented without significant expense. Each of the move mode and sonic mode may be turned on or off depending on whether super resolution images are desired.

Figure 26:
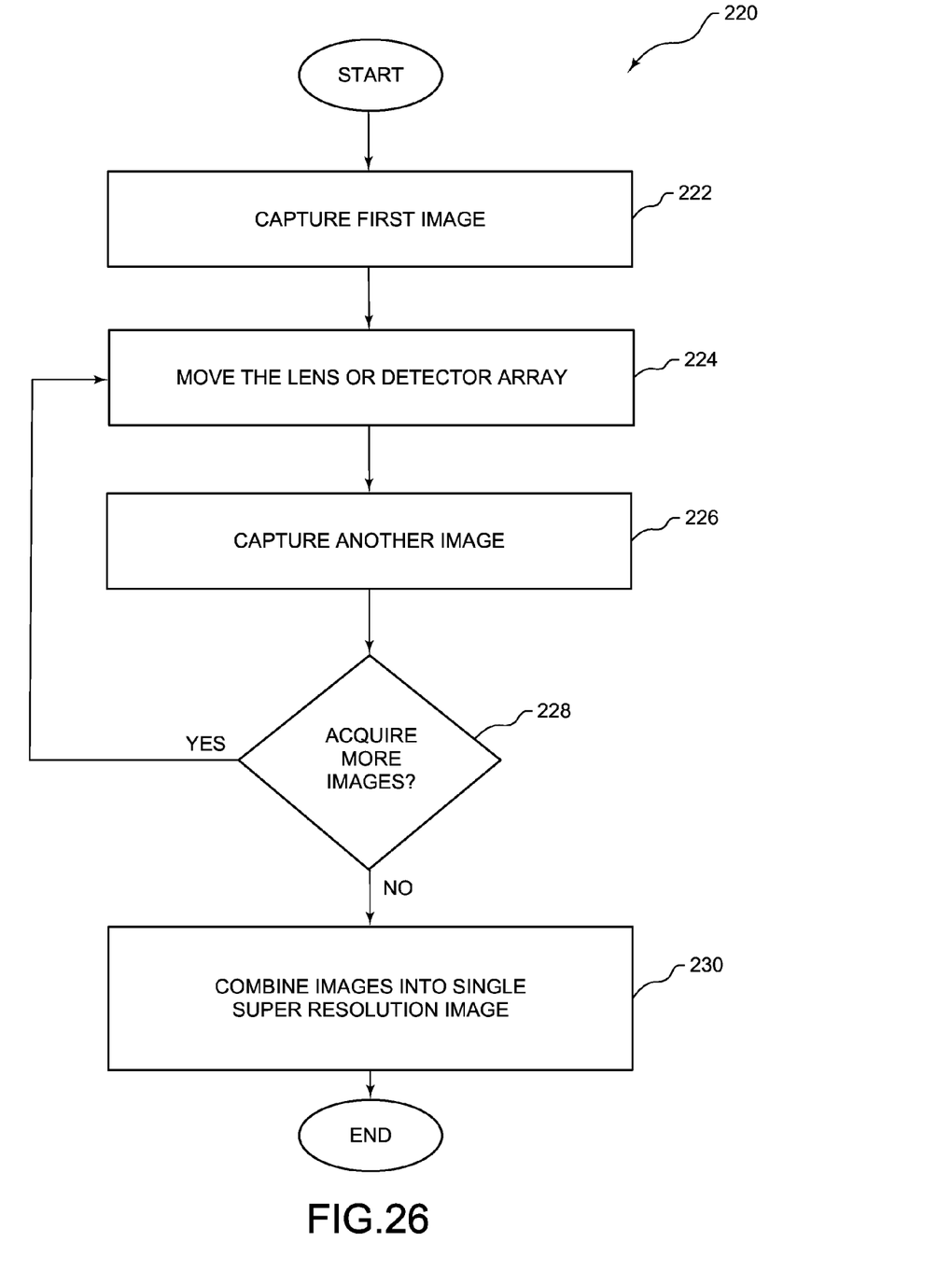
FIG. 26 is a flowchart illustrating a process for enhancing a resolution of a digital camera, in accordance with another embodiment.

Turning now to FIG. 26, with continued reference to FIGS. 1-25, a process 220 for enhancing a resolution of a digital camera system having a lens and a detector array is shown, in accordance with another embodiment of the present disclosure. At block 222, the detector array captures a first image. At block 224, motion is imparted to one of the lens and the detector array. The detector array captures another image at block 226. Then, at block 228, the control unit of the camera system determines whether more images will be captured. Depending on predetermined resolution enhancement dimensions, more images may need to be captured. For instance, for a two-by-two (2×2) resolution enhancement, four images in different locations need to be captured. If more images need to be acquired, the process 220 proceeds to block 224 and repeats blocks 224 and 226 until all predetermined images are captured. If more images do not need to be acquired, then at block 230, the images are combined into a single image having enhanced resolution.

Figure 27:
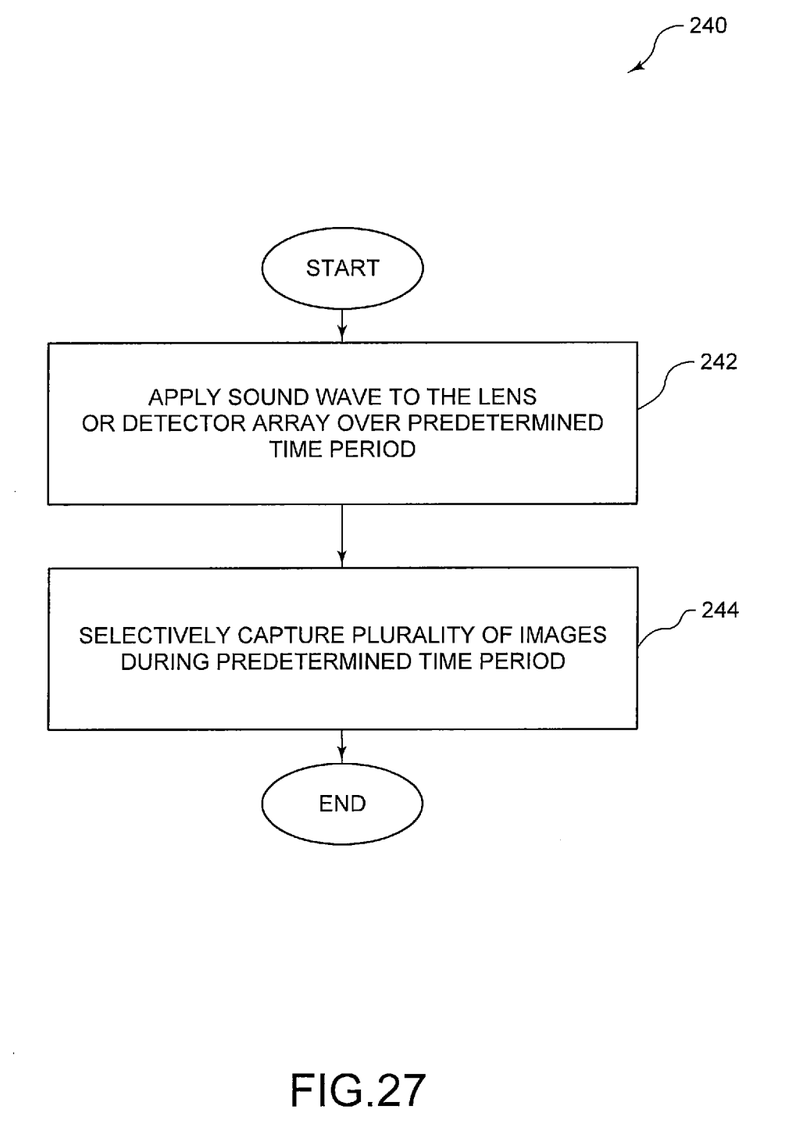
FIG. 27 is a flowchart illustrating another process for enhancing a resolution of a digital camera, in accordance with another embodiment.

Another process 240 for enhancing the resolution of the digital camera system is shown in FIG. 27. At block 242, a sound wave may be applied across one of the lens and the detector array over a predetermined time period. At block 244, during the predetermined time period when the sound wave is applied, the detector array selectively captures a plurality of images.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A camera system for producing super resolution images, the camera system comprising:
   a lens;
   a detector array configured to capture an image focused through the lens onto a focal plane; a transducer coupled to one of the lens and the detector array, the transducer configured to convert electrical signals into mechanical energy and impart motion to the one of the lens and the detector array over a predetermined time period, the detector array capturing a plurality of images over the predetermined time period;

a control unit in communication with the transducer, the control unit configured to divide the detector array into sub-pixels and send signals to the transducer to move the one of the lens and the detector array outside a boundary of the image projected onto the focal plane to form a border of a reference array during at least at of the predetermined time period; and a processing unit in communication with the control unit, the processing unit configured to determine a light intensity of each of the sub-pixels from the plurality of images and combine the light intensities of the sub-pixels to produce a single image, the sub-pixels of the border of the reference array having light intensities of zero.

2. The camera system of claim 1, wherein the processing unit is further configured to produce the single image by interleaving the plurality of images.

3. The camera system of claim 1, wherein the processing unit is further configured to produce the single image using linear algebra.

4. The camera system of claim 3, wherein at least part of the detector array extends outside a boundary of the focal plane.

5. The camera system of claim 1, wherein the transducer comprises a piezoelectric transducer.

6. The camera system of claim 1, wherein the transducer is further configured to move the one of the lens and the detector array in increments along a horizontal direction and a vertical direction.

7. The camera system of claim 6, wherein the transducer is coupled to the detector array, and each increment comprises a fraction of a length of an individual detector in the detector array.

8. The camera system of claim 7, wherein the transducer is further configured to incrementally move the detector array relative to the focal plane according to predetermined resolution enhancement dimensions.

9. The camera system of claim 8, wherein a target image and the lens remain stationary over the predetermined time period.

10. The camera system of claim 6, wherein the transducer is coupled to the lens, the transducer being configured to move the lens over the predetermined time period while the detector array remains stationary.

11. The camera system of claim 1, wherein the transducer comprises a speaker transducer configured to apply a sound wave across the one of the lens and the detector array.

12. The camera system of claim 5, wherein the piezoelectric transducer is configured to stretch and compress the detector array to induce a pressure wave.

13. A method for enhancing a resolution of a digital camera system having a lens and a detector array, the method comprising:

the detector array capturing an image;

dividing the detector array into sub-pixels;

imparting motion to one of the lens and the detector array to move the one of the lens and the detector array outside a boundary of the image projected onto a focal plane to form a border of a reference array;

the detector array capturing another image;

determining a light intensity of each of the sub-pixels from the images, the sub-pixels of the border of the reference array having light intensities of zero; and combining the light intensities of each of the sub-pixels to produce a single image having enhanced resolution.

14. The method of claim 13, wherein the step of imparting motion to one of the lens and the detector array comprises shifting the detector array to a different position using a transducer coupled to the detector array.

15. The method of claim 14, further comprising the transducer advancing the detector array in increments along horizontal and vertical directions, and the detector array capturing an image after each increment.

16. The method of claim 13, wherein the step of imparting motion to one of the lens and the detector array comprises a transducer inducing a pressure wave across the one of the lens and the detector array.

17. A method for enhancing a resolution of a digital camera system having a lens and a detector array, the method comprising:

dividing the detector array into sub-pixels;

applying a sound wave across one of the lens and the detector array to move the one of the lens and the detector array outside a boundary of an image projected onto a focal plane to form a border of a reference array over at least part of a predetermined time period;

selectively capturing a plurality of images using the detector array during the predetermined time period;

determining a light intensity of each of the sub-pixels from the plurality of images, the sub-pixels of the border of the reference array having light intensities of zero; and combining the light intensities of the sub-pixels to produce a single image.

18. The method of claim 17, wherein the step of selectively capturing a plurality of images using the detector array over the predetermined time period comprises capturing at least one image when the detector array is in an unstrained state, at least one image when the detector array is in a maximum compressed state, and at least one image when the detector array is in a maximum stretched state.

19. The method of claim 18, further comprising comparing intensities from the plurality of images to determine photon counts on sub-pixels of a combined image.

20. The method of claim 17, further comprising using at least two different directions of sound wave propagation across the one of the lens and the detector array.

* * * * *